Oct. 8, 1940.                      H. YATES                     2,217,089
                  MACHINE FOR TESTING THE HARDNESS OF MATERIALS
                          Filed March 4, 1939            2 Sheets-Sheet 2
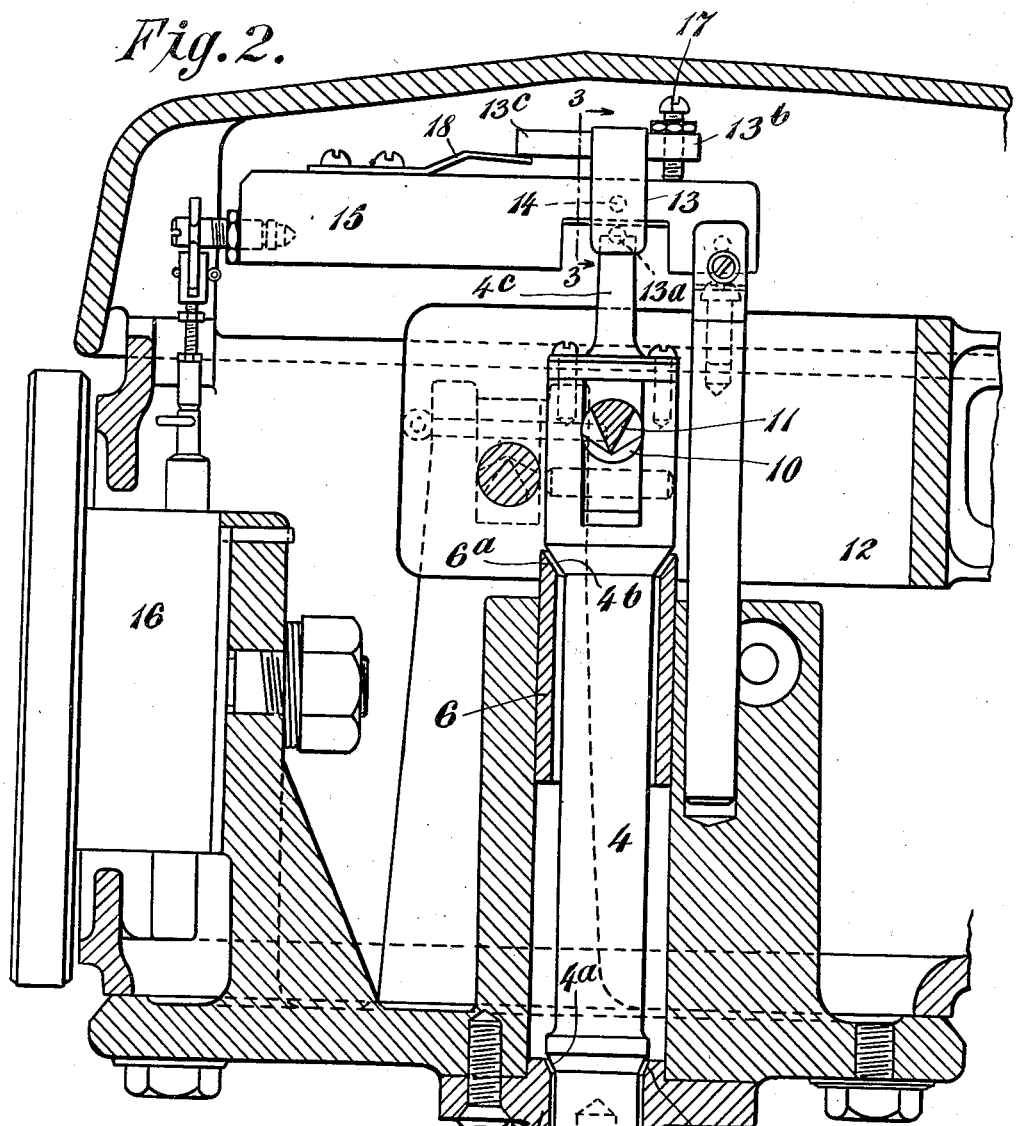
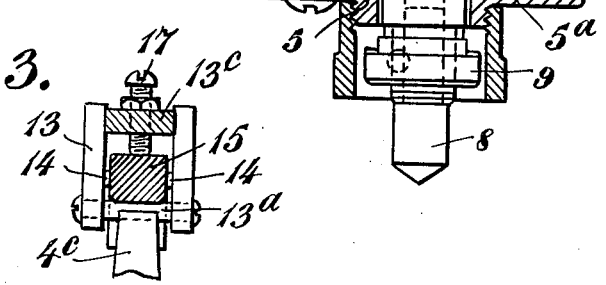

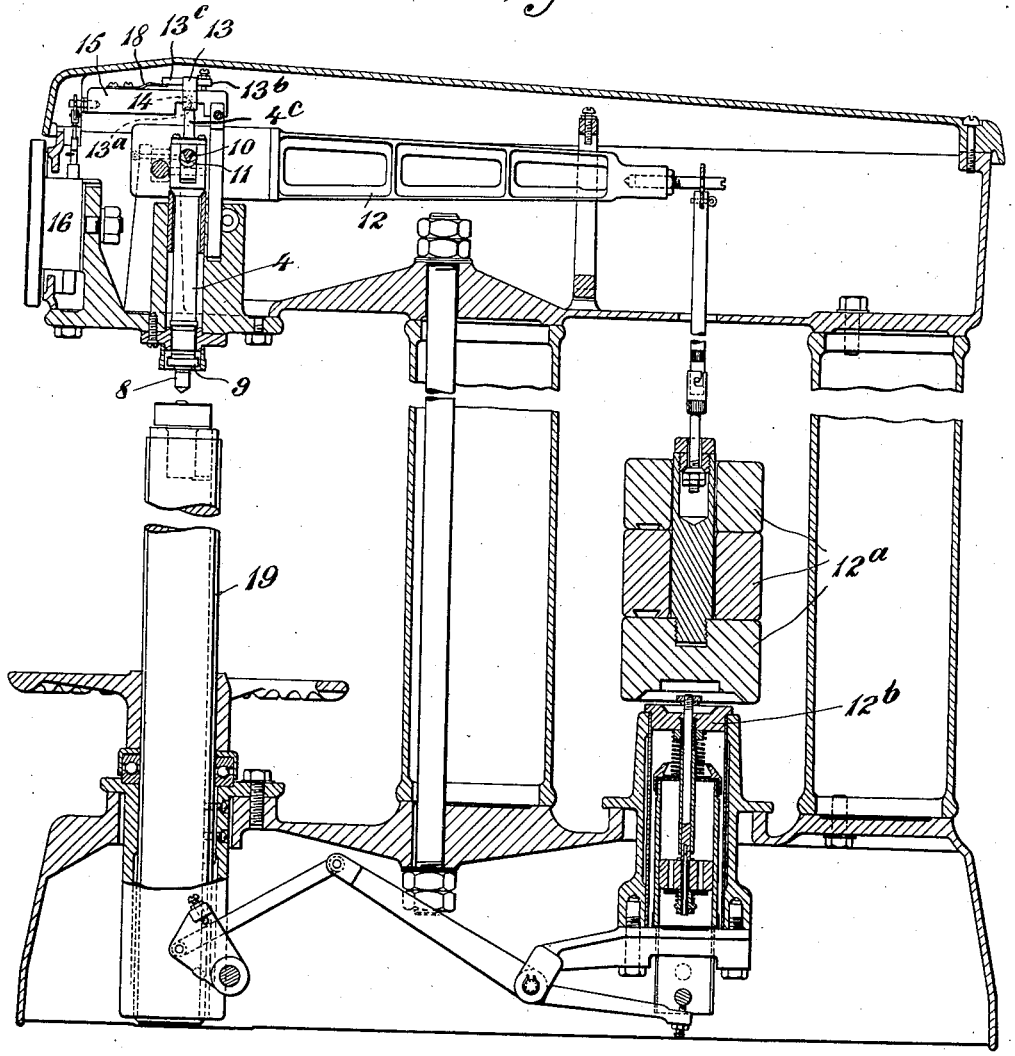

Patented Oct. 8, 1940

2,217,089

UNITED STATES PATENT OFFICE 2,217,089

MACHINE FOR TESTING THE HARDNESS OF MATERIALS

Harry Yates, Birmingham, England, assignor to W. & T. Avery Limited, Birmingham, England Application March 4, 1939, Serial No. 259,780
In Great Britain March 5, 1938

2 Claims. (Cl. 265—12)

This invention has reference to improvements in machines for testing the hardness of materials, and is applicable more particularly to machines of the type described for example in the complete specification of British Letters Patent Nos. 353,729 and 422,972.

The object of the present invention is to enhance the accuracy of a test carried out by machines of this type, and to provide a simple means for adjusting the setting of the automatic indicating mechanism to ensure an accurate reading of the indications.

The invention consists of improvements in hardness testing machines of the kind hereinbefore referred to, characterised in that when a test is being accomplished the penetrator carrier element is entirely free of contact with its normal support so that during a test the element only has three points or lines of contact, (one) where the penetrator contacts with the test piece, (two) where the penetrator carrier element contacts with the knife-edge of the main weighted lever, and (three) at its upper end where the motion of the said element is transmitted through a transfer lever to the automatic indicating mechanism, the three said points or lines of contact being in vertical alignment through the axis of the penetrator carrier element; the invention is further characterised in that at the point or line where the upper end of the said element contacts with the transfer lever through which the movement of the element is communicated to the automatic indicating mechanism there is provided an adjustable saddle which forms part of the said lever whereby the automatic indicating mechanism may be initially set or adjusted.

The invention will now be described with particular reference to the accompanying sheets of drawings, wherein—

Figure 1 is a view partly in elevation and partly in section of the improved hardness testing machine.

Figure 2 is a view on an enlarged scale of the portion of the testing machine illustrated in Figure 1 with which the invention is concerned, and Figure 3 is a fragmentary view in part sectional front elevation of the means for transmitting the movement of the penetrator carrier element to the automatic indicating mechanism.

As the machine illustrated in Figure 1 of the drawings follows the generally accepted practice and has been described already insofar as its main features are concerned in the prior British patent specification No. 422,972 hereinbefore referred to the machine itself will not be described in any detail but only the particular features which constitute the present invention.

The penetrator carrier element 4 takes the form in the main of a rod 4 of circular section which is normally supported by means of two conical seatings 4ª, 4ᵇ adjacent its opposite ends on conical bearing seats 5ª, 6ª formed in sleeves 5 and 6 secured in the head framework 7 of the machine. The lower end of this rod 4 has coupled thereto the penetrator element 8 which in the form shown is a hardened steel cone pointed member although a ball or a diamond may be substituted therefor. This penetrating element 8 is removably coupled to the main section of the carrier element 4 by a cam and ball locking sleeve connection 9 of known type, so that any interchange may be made to suit different forms of test or for replacement purposes. Adjacent the upper end of the penetrator carrier element there is provided a bearing block 10 which is adapted to support the load knife-edge 11 of the main weighted lever 12 through which the predetermined or standard load consisting of the weights 12ª is applied to the specimen upon the lowering of the support 12ᵇ. Above the said bearing block 10 the carrier element is connected to a stool 4ᶜ which constitutes the upper extension of the said element. The top face of this stool 4ᶜ contacts with a hardened steel cross pin 13ª which is mounted in and forms part of a saddle 13 which is pivotally mounted by means of a pin 14 on the transfer lever 15 by means of which the motion of the penetrator carrier element 4 is transmitted to the automatic indicating mechanism 16. The said saddle 13 is provided with two oppositely extending lateral arms 13ᵇ, 13ᶜ, one arm namely 13ᵇ being adapted to constitute a mounting for a set screw 17 whereas the other, namely 13ᶜ has contact with the free end of a leaf spring 18 which is bolted at its other end to the said transfer lever 15.

The specimen is placed on top of the screw 19 which is caused to be raised so as to bring the specimen into contact with the penetrator element 8 and to lift the penetrator carrier element 4 bodily off its seatings 5ª, 6ª to apply the initial loading in known manner and as set out in British patent specification No. 353,729.

It will be appreciated that the cone point of the penetrator carrier element 4, the knife-edge of the bearing block 10 and the point of contact between the stool 4ᶜ and the cross pin 13ª are in the vertical plane containing the axis of the penetrator carrier element 4 when the said element is raised from its seatings 5ª, 6ª during a test.

It will be appreciated that by rotating the set screw 17 the saddle 13 is rocked about its pivot 14 on the transfer lever 15 and within fine limits the point of contact of the cross pin 13ª with the upper face of the stool 4c mounted on the penetrator carrier element 4 may be varied so that the automatic indicating mechanism 16 may be accurately set initially in relation to the associated parts of the machine.

What I claim is:

1. A hardness testing machine incorporating means for supporting the test piece, a penetrator element, a carrier element for said penetrator element, seatings for locating said carrier element in the out of action position, means for lifting said carrier element off said seatings in the initial stages of a test, a means for loading said carrier, a contact between said loading means and the carrier element in a vertical plane which also contains the axis of the carrier element, an automatic indicating mechanism, a transfer lever for transmitting movement of the carrier element to the indicating mechanism, a saddle pivotally mounted on the transfer lever, a cross pin carried by said saddle, a stool fixed relatively to the said carrier and in contact with said cross pin in a vertical plane which also contains the axis of the carrier element, a blade spring secured at one end to the transfer lever and being adapted at its other and free end to abut one end of the saddle so as to tend to rock the saddle about its pivot and a screw pin mounted in the other end of the saddle, the manipulation of the said screw pin in conjunction with the aforesaid spring permitting the position of the saddle relatively to the transfer lever to be adjusted.

2. A hardness testing machine incorporating means for supporting the test piece, a penetrator element, a carrier element for said penetrator element, seatings for locating said carrier element in the out of action position, means for lifting said carrier element off said seatings in the initial stages of a test, a means for loading said carrier, a contact between said loading means and the carrier element in a vertical plane which also contains the axis of the carrier element, an automatic indicating mechanism, a transfer lever for transmitting the movement of the carrier element to the indicating mechanism, a saddle pivotally mounted on the transfer lever and having oppositely extending arms, a cross pin carried by said saddle, a stool fixed relatively to the said carrier and in contact with said cross pin in a vertical plane which also contains the axis of the carrier element, a blade spring secured at one end to the transfer lever and having its other free end adapted to bear on the underside of one of the extending arms of the saddle and a screw pin turnably mounted in the other extending arm of the saddle, the manipulation of the said screw pin in conjunction with the aforesaid spring enabling the position of the saddle relatively to the transfer lever to be adjusted.

HARRY YATES.